United States Patent
Fenton et al.

(10) Patent No.: US 6,184,822 B1
(45) Date of Patent: Feb. 6, 2001

(54) SPLIT C/A CODE RECEIVER

(75) Inventors: Patrick C. Fenton, Calgary (CA); Albert J. Van Dierendonck, Los Alto, CA (US)

(73) Assignee: NovAtel, Inc., Calgary (CA)

(*) Notice: Under 35 U.S.C. 154(b), the term of this patent shall be extended for 0 days.

(21) Appl. No.: 09/138,932

(22) Filed: Aug. 24, 1998

(51) Int. Cl.$^7$ .............................. H04B 7/185; G01S 5/02
(52) U.S. Cl. .................... 342/357.12; 701/213; 375/208; 375/209
(58) Field of Search ..................... 342/357.12; 701/213; 375/208, 209

(56) References Cited

U.S. PATENT DOCUMENTS

| | | | |
|---|---|---|---|
| 5,724,046 | * | 3/1998 | Martin et al. |
| 5,736,961 | | 4/1998 | Fenton et al. ............... 342/357 |
| 5,963,582 | * | 10/1999 | Stansell, Jr. .............. 375/200 |

FOREIGN PATENT DOCUMENTS

99/14617   3/1999   (WO).

OTHER PUBLICATIONS

Shirer H.O., "Preparing Now for the Future: U.S. Civil Radionavigation Policy and Planning", IEEE 1998 Position Location and Navigation Symposium.

Kovach K.L. et al., "GPS in 10 Years", Microwave Journal, U.S. Horizon House. Dedham, vol. 41, NR. 2, pp. 22, 24, 26, 28, 30, 32, 36, 39, and 40.

* cited by examiner

Primary Examiner—Theodore M. Blum
(74) Attorney, Agent, or Firm—Cesari and McKenna, LLP (57) ABSTRACT

A GPS receiver that acquires and tracks a split-C/A code separately aligns with the received signal the phases of a locally-generated 10.23 MHz square wave, which can be thought of as a 20.46 MHz square-wave code, and a locally-generated 1.023 MHz C/A code. The receiver first aligns the phase of the locally-generated square-wave code with the received signal, and tracks one of the multiple peaks of the split-C/A code autocorrelation function. It then shifts the phase of the locally-generated C/A code with respect to the phase of the locally-generated square-wave code, to align the local and the received C/A codes and position the correlators on the center peak of the split-C/A. The receiver then tracks the center peak directly, using a locally-generated split-C/A code.

20 Claims, 8 Drawing Sheets

SPLIT C/A CODE RECEIVER

FIELD OF INVENTION

This invention relates generally to global position system (GPS) receivers and, more particularly to GPS receivers that receive "split-C/A code" signals.

BACKGROUND OF THE INVENTION

A GPS receiver determines its global position based on the signals it receives from orbiting GPS or other satellites. The GPS satellites transmit signals using two carriers, namely, an L1 carrier at 1575.42 MHz and an L2 carrier at 1227.60 MHz. Each carrier is modulated by at least a binary pseudorandom (PRN) code, which consists of a to seemingly random sequence of ones and zeros that periodically repeat. The ones and zeros in the PRN code are referred to as "code chips," and the transitions in the code from one to zero or zero to one, which occur at "code chip times," are referred to as "bit transitions." Each satellite uses a unique PRN code, and thus, a GPS receiver can associate a received signal with a particular satellite by determining which PRN code is included in the signal.

The GPS receiver calculates the difference between the time a satellite transmits its signal and the time that the receiver receives the signal. The receiver then calculates its distance, or "pseudorange," from the satellite based on the associated time difference. Using the pseudoranges from at least four satellites, the receiver determines its global position.

To determine the time difference, the GPS receiver synchronizes a locally-generated PRN code with the PRN code in the received signal by aligning the code chips in each of the codes. It then determines how much the locally-generated PRN code is shifted, in time, from the known timing of the satellite PRN code at the time of transmission, and calculates the associated pseudorange. The more closely the GPS receiver aligns the locally-generated PRN code with the PRN code in the received signal, the more precisely the GPS receiver can determine the associated time difference and pseudorange and, in turn, its global position.

The code synchronization operations include acquisition of the satellite PRN code and tracking the code. To acquire the PRN code, the GPS receiver generally makes a series of correlation measurements that are separated in time by a code chip. After acquisition, the GPS receiver tracks the received code. It generally makes "early-minus-late" correlation measurements, i.e., measurements of the difference between (i) a correlation measurement associated with the PRN code in the received signal and an early version of the locally-generated PRN code, and (ii) a correlation measurement associated with the PRN code in the received signal and a late version of the local PRN code. The GPS receiver then uses the early-minus-late measurements in a delay lock loop (DLL), which produces an error signal that is proportional to the misalignment between the local and the received PRN codes. The error signal is used, in turn, to control the PRN code generator, which shifts the local PRN code essentially to minimize the DLL error signal.

The GPS receiver also typically aligns the satellite carrier with a local carrier using correlation measurements associated with a punctual version of the local PRN code. To do this the receiver uses a carrier tracking phase lock loop.

A GPS receiver receives not only line-of-sight, or direct path, satellite signals but also multipath signals, which are signals that travel along different paths and are reflected to the receiver from the ground, bodies of water, nearby buildings, etc. The multipath signals arrive at the GPS receiver after the direct-path signal and combine with the direct-path signal to produce a distorted received signal. This distortion of the received signal adversely affects code synchronization operations because the correlation measurements, which measure the correlation between the local PRN code and the received signal, are based on the entire received signal—including the multipath components thereof. The distortion may be such that the GPS receiver attempts to synchronize to a multipath signal instead of to the direct-path signal. This is particularly true for multipath signals that have code bit transitions that occur close to the times at which code bit transitions occur in the direct-path signal.

One way to more accurately synchronize the received and the locally-generated PRN codes is to use the "narrow correlators" discussed in U.S. Pat. Nos. 5,101,416; 5,390,207 and 5,495,499, all of which are assigned to a common assignee and incorporated herein by reference. It has been determined that narrowing the delay spacing between early and late correlation measurements substantially reduces the adverse effects of noise and multipath signal distortion on the early-minus-late measurements.

The delay spacing is narrowed such that the noise correlates in the early and late correlation measurements. Also, the narrow correlators are essentially spaced closer to a correlation peak that is associated with the punctual PRN code correlation measurements than the contributions of many of the multipath signals. Accordingly, the early-minus-late correlation measurements made by these correlators are significantly less distorted than they would be if they were made at a greater interval around the peak. The closer the correlators are placed to the correlation peak, the more the adverse effects of the multipath signals on the correlation measurements are minimized. The delay spacing can not, however, be made so narrow that the DLL can not lock to the satellite PRN code and then maintain code lock. Otherwise, the receiver cannot track the PRN code in the received signal without repeatedly taking the time to re-lock to the code.

With conventional GPS satellites, the L1 carrier is modulated by two PRN codes, namely, a 1.023 MHz C/A code, and a 10.23 MHz P-code that is encrypted with an encryption code that is known only to government-classified users, such as the military. The L2 carrier is modulated by the encrypted P-code. Generally, a GPS receiver constructed in accordance with the above-referenced patents acquires the satellite signal using a locally-generated C/A code and a locally-generated L1 carrier. After acquisition, the receiver synchronizes the locally-generated C/A code and L1 carrier with the C/A code and L1 carrier in the received signal, using the narrow correlators in a DLL and a punctual correlator in the carrier tracking loop. The receiver may then use the C/A code tracking information to track the L1 and/or L2 P-codes, which have known timing relationships with the C/A code, and with each other.

In a new generation of satellites, the L2 carrier is also modulated by a C/A code that is, in turn, modulated by a 10.23 MHz square wave. The square wave modulated C/A code, which we refer to hereinafter as the "split C/A code," has maximums in its power spectrum at offsets of ±10 MHz from the L2 carrier, or in the nulls of the power spectrum of the P-code. The split C/A code can thus be selectively jammed, as necessary, without jamming the L2 P-code.

The autocorrelation function associated with the split C/A code has an envelope that corresponds to the autocorrelation of the 1.023 MHz C/A code and multiple peaks within the envelope the correspond to the autocorrelation of the 10.23 MHz square wave. There are thus 20 peaks within a two chip C/A code envelope, or a square wave autocorrelation peak every 0.1 C/A code chips. The multiple peaks associated with the square wave are each relatively narrow, and thus, offer increased code tracking accuracy, assuming the DLL tracks the correct narrow peak.

It is our understanding that known GPS receivers acquire and track the split-C/A code in a conventional manner, using a locally-generated split-C/A code and L2 carrier. The receivers thus attempt to align the code chips of a receiver-generated split-C/A code with the code chips of the received split-C/A code, to track the center peak of the square-wave autocorrelation function. In the absence of multipath signals, the receivers track the center peak by tracking a peak that has the largest amplitude. If multipath signals are included in the received signal, however, the amplitude of the center peak of the square-wave autocorrelation function may not be discernibly greater than the amplitudes of nearby peaks. Accordingly, the DLL may track a peak that is 0.1 or 0.2 C/A code chips away from the center peak, and the receiver thus produce correspondingly inaccurate position measurements.

SUMMARY OF THE INVENTION

The invention is a GPS receiver that acquires and tracks a split-C/A code by separately aligning with the received signal the phases of a locally-generated 10.23 MHz square wave, which can be thought of as a 20.46 MHz square-wave code, and a locally-generated 1.023 MHz C/A code. The receiver first aligns the phase of the locally-generated square-wave code with the received signal, and tracks one of the multiple peaks of the split-C/A code autocorrelation function. It then shifts the phase of the locally-generated C/A code with respect to the phase of the locally-generated square-wave code, to align the local and the received C/A codes and position the correlators on the center peak of the split-C/A. The receiver then tracks the center peak directly, using a locally-generated split-C/A code.

More specifically, the GPS receiver acquires the satellite signal by making correlation measurements associated with the locally-generated split-C/A code. The receiver next aligns the locally-generated square-wave code with the received signal, using in a DLL the early-minus-late correlation measurements that are associated with the locally-generated square-wave code. It thus adjusts the phase of the square-wave code to minimize the DLL error signal, and track one of the multiple autocorrelation peaks.

When the DLL is locked, the receiver essentially removes the square-wave code from the received signal by multiplying the received signal by a punctual version of the locally-generated square-wave code. This collapses the power spectrum of the received signal to the power spectrum of the C/A code. The receiver next aligns the locally-generated C/A code with the C/A code in the received signal, that is, it tracks the peak in the envelope of the split-C/A code autocorrelation function. It thus uses early-minus-late correlation measurements that are associated with the locally-generated C/A code in a DLL and appropriately adjusts the phase of the C/A code relative to the phase of the square-wave code, to minimize the DLL error signal. The receiver is then tracking the location of the center peak of the split-C/A code autocorrelation peak, since the two peaks coincide at the time of transmission and should still essentially coincide in time at the receiver. The receiver then tracks the center peak directly, using in a DLL the early-minus-late correlation measurements that are associated with the locally-generated split-C/A code.

Alternatively, after the receiver aligns the locally-generated square-wave code with the received signal, the receiver determines the location of the center peak of the split C/A code autocorrelation function by making early-minus-late correlation measurements associated with the locally-generated split-C/A code at the locations of the positive peaks in the split-C/A code autocorrelation function. The receiver thus uses a correlator delay spacing of two square-wave code chips to determine the relative amplitudes of the positive peaks and select the center positive peak. The receiver then tracks the selected center peak with narrow correlators that have a delay spacing of a fraction of a square-wave code chip.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
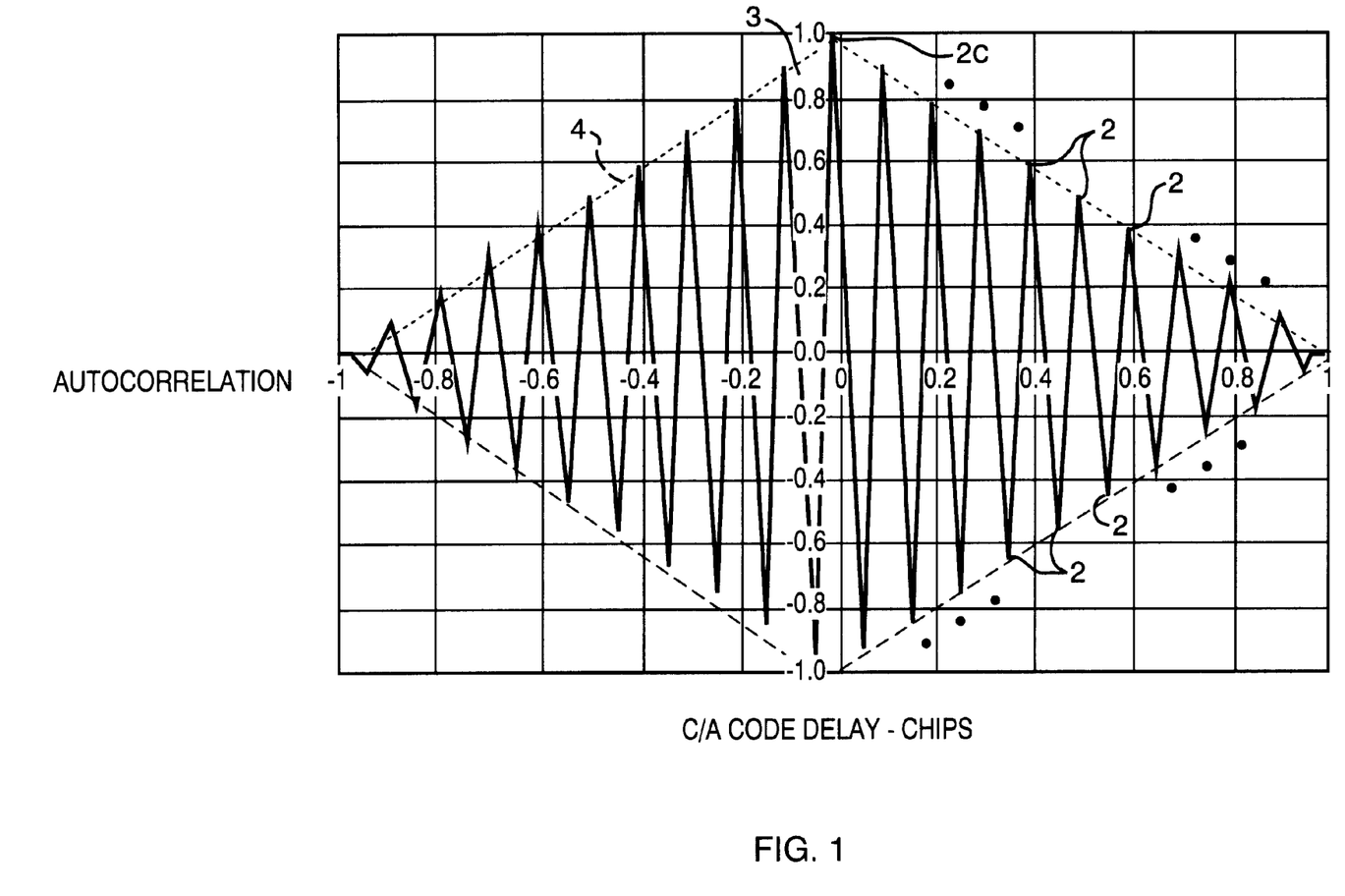
FIG. 1 is a diagram of the split-C/A code autocorrelation function.

Referring to FIG. 1, a split-C/A code, which consists of a 1.023 MHz C/A code that is modulated by, or digitally mixed with, a 10.23 MHz square wave, has an associated autocorrelation function 1 that includes multiple peaks 2 within an envelope 4 that corresponds to a C/A-code auto-correlation function. The multiple peaks 2 are associated with the autocorrelation of the 10.23 MHz square wave, which can be thought of as a 20.46 MHz. square-wave code that has alternating bits 1,0,1,0 . . . , and so forth. For ease of understanding, we refer to the multiple autocorrelation peaks 2 as "minor peaks" hereinafter.

In the absence of multipath, the amplitude of the center minor peak 2c exceeds the amplitudes of the other minor peaks. In the presence of "normal" multipath, that is, multipath signals that at the receiver have less power than the direct path signals, the center minor peak 20 still has a greater amplitude than the other minor peaks. However, the minor peaks surrounding the center minor peak have amplitudes that are relatively close to the amplitude of the center minor peak. Accordingly, a GPS receiver that tracks the minor peak with the apparent largest amplitude may not be tracking the center minor peak. The GPS receiver discussed below relatively quickly tracks the center minor peak of the split-C/A code autocorrelation function, even in the presence of normal multipath.

In the presence of "severe" multipatlh, that is, multipath signals that at the receiver have more power then the direct path signals, such as, for example, signals that are reflected from objects above the receive antenna, all known receivers, including the one discussed below, could acquire and lock onto the wrong minor peak. Thus, care must be taken in this type of environment.

To circumvent prolonged tracking of the wrong minor peak, the GPS receiver discussed below may include an additional channel that is temporarily assigned to the subject satellite. The additional channel is operated in a square wave tracking mode that is described below. In this mode, the channel reverts to tracking the location of the correct minor peak, when the multipath signals subside. If the GPS receiver is on a moving platform, the period of time in which the additional channel is assigned to the subject satellite is relatively short, and thus, the GPS receiver discussed below relatively quickly tracks the center minor peak 2C, even in an environment in which severe multipath can occur.

Figure 2A:
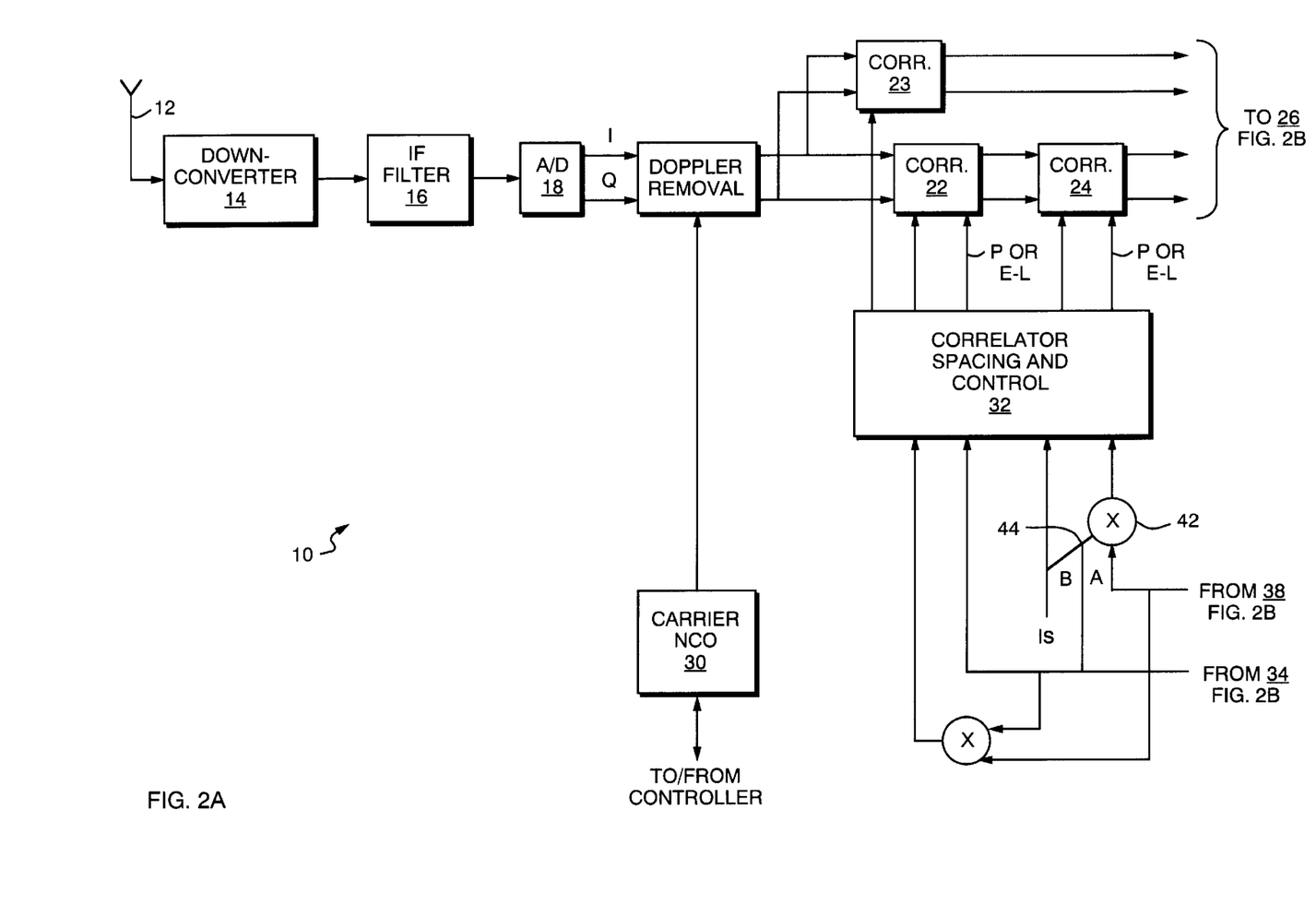
FIG. 2 is functional block diagram of a receiver constructed in accordance with the invention.
Figure 2B:
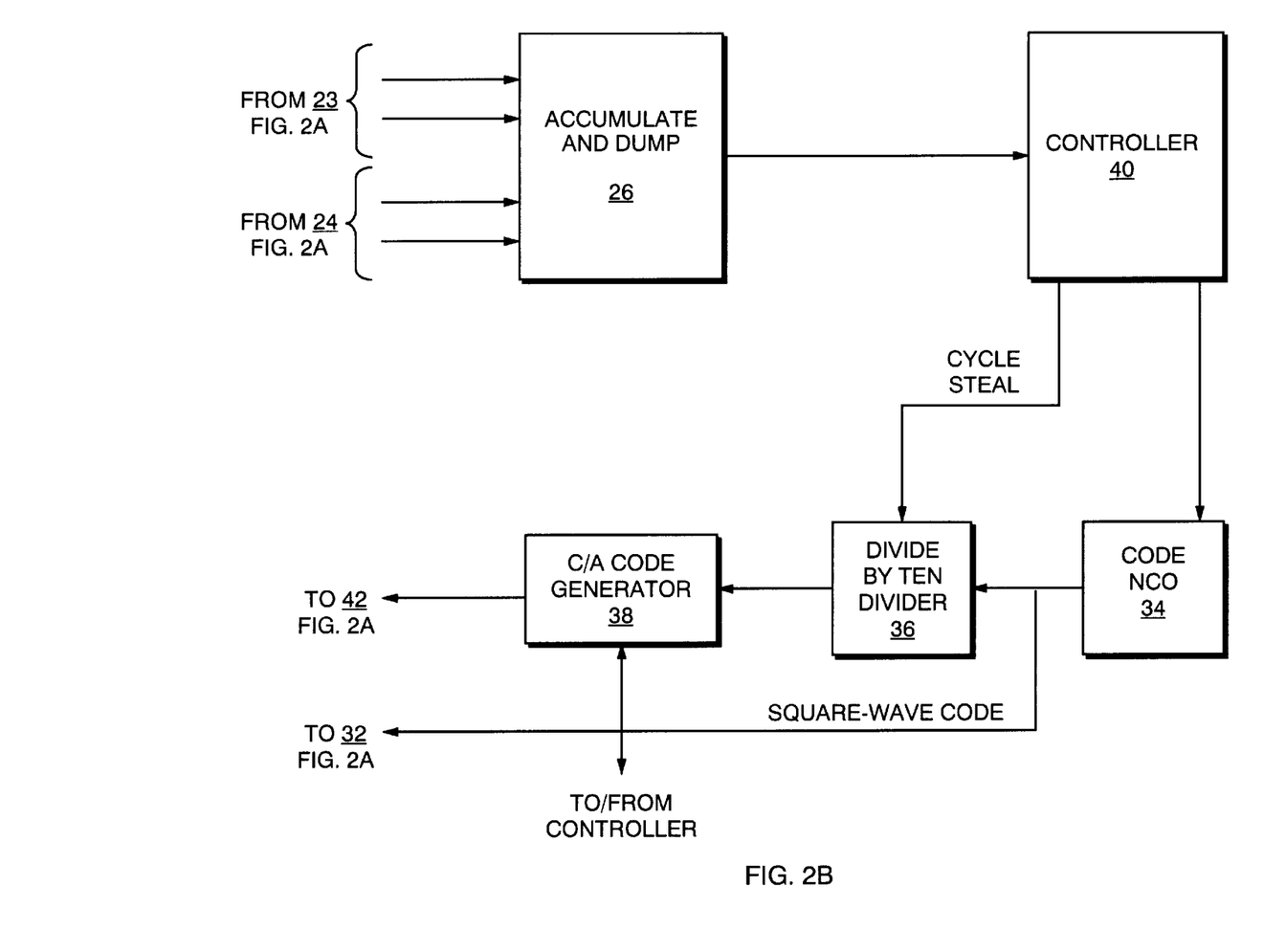

Referring now also to FIG. 2, a GPS receiver 10 receives over a receive antenna 12 a composite signal that includes the split-C/A codes transmitted by all of the satellites that are in view. The composite signal is applied to a downconverter 14 that, in a conventional manner, converts the received L2 signal to an intermediate frequency ("IF") signal that has a frequency which is compatible with an analog-to-digital converter 18.

The IF signal is next applied to an IF bandpass filter 16 that has a bandpass at the desired carrier frequency. The bandwidth of the filter 16 should be sufficiently wide to allow the primary harmonic of the split-C/A code to pass, or approximately 30 MHz.

The analog-to-digital converter 18 samples the filtered IF signal at a rate that satisfies the Nyquist theorem and produces corresponding digital inphase (I) and quadrature (Q) signal samples in a known manner. The I and Q digital signal samples are supplied to a doppler removal processor 20 that operates in a known manner to produce baseband I and Q samples by rotating the signals in accordance with an estimate of the L2 carrier phase angle that the processor receives from a carrier numerically controlled oscillator ("carrier NCO") 30.

The I and Q samples are next supplied to correlators 22, 23 and 24 that each make correlation measurements by multiplying the I and Q samples by early, punctual and/or late versions of an appropriate locally-generated code, as discussed below. The I and Q correlation measurements are Supplied to an accumulate circuit 26, which accumulates them for predetermined intervals. At the end of each interval, the accumulate circuit 26 supplies the results of the I and Q accumulations to a controller 40, which controls the carrier NCO 30, a code NCO 34 and an associated divide-by-ten divider 36, and correlator spacing and control circuitry 32. The operations of the controller 40, the code NCO 34 and the correlator spacing and control circuitry 32 are discussed in more detail below.

The code NCO 34 produces a 10.23 MHz square wave signal that is used as the 20.46 MHz square-wave code. The 10.23 MHz square wave signal is also divided down by the divider 36, to produce a 1.023 MHz clock signal for a C/A code generator 38 that generates the locally-generated 1.023 MHz C/A code.

Correlation measurements associated with the split-C/A code are produced either by simultaneously supplying the 20.46 MHz square-wave code to the first correlator 22 and the 1.023 MHz C/A code to the second correlator 24, or by supplying the two codes to a multiplier 42, which multiplies the codes together and supplies the product to a single correlator, for example, correlator 24.

We discuss below the operations of the correlators and associated correlator spacing and control circuitry 32 during acquisition and tracking of the split C/A code and the L2 carrier, without reference to the acquisition and tracking operations associated with the L1 signals. Further, we do not describe in detail the carrier tracking operations, which are well known to those skilled in the art and are essentially unchanged by the use of the split-C/A code.

Figure 3A:
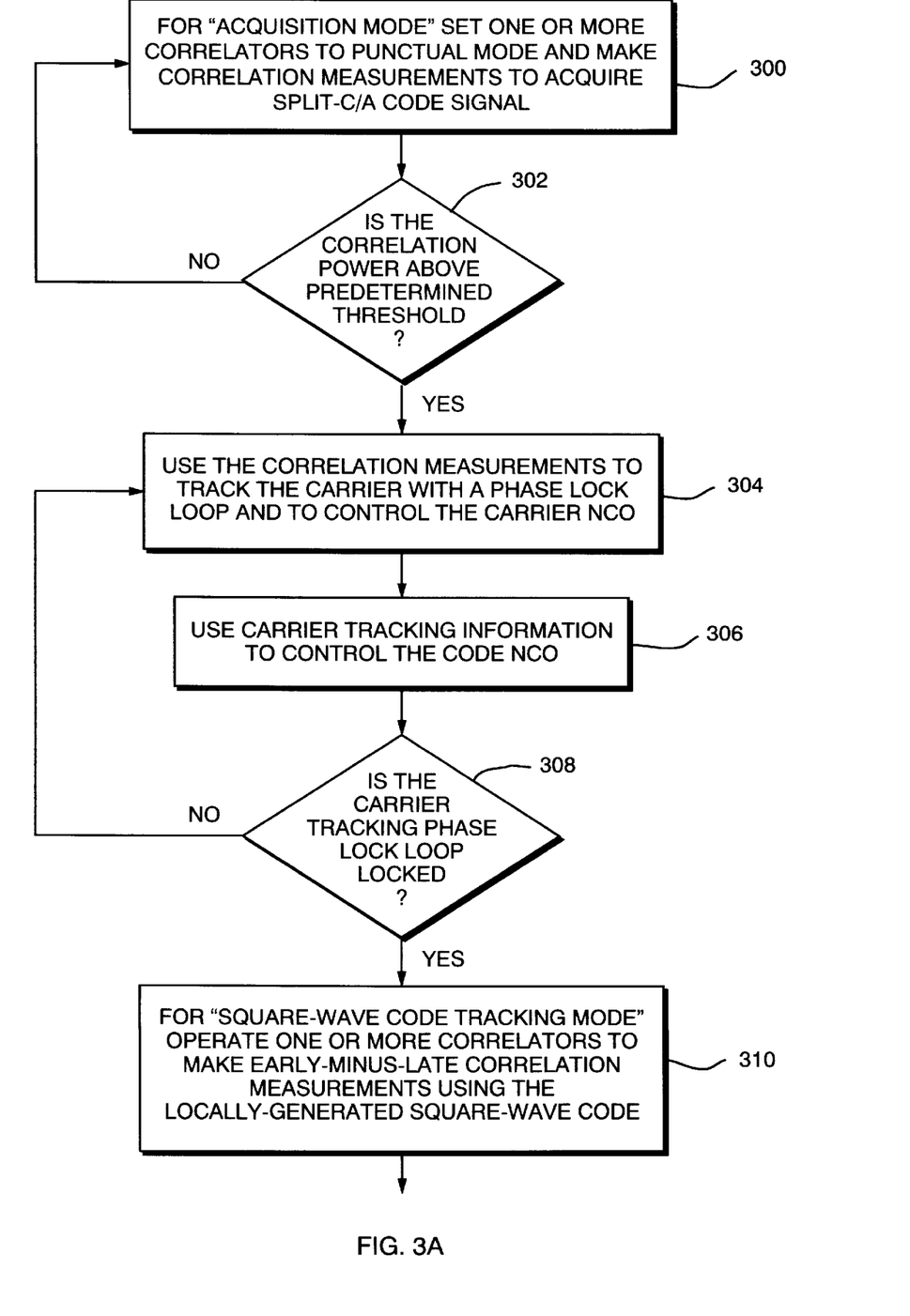
FIG. 3 is flow chart of the operations of the receiver of FIG. 2.
Figure 3B:
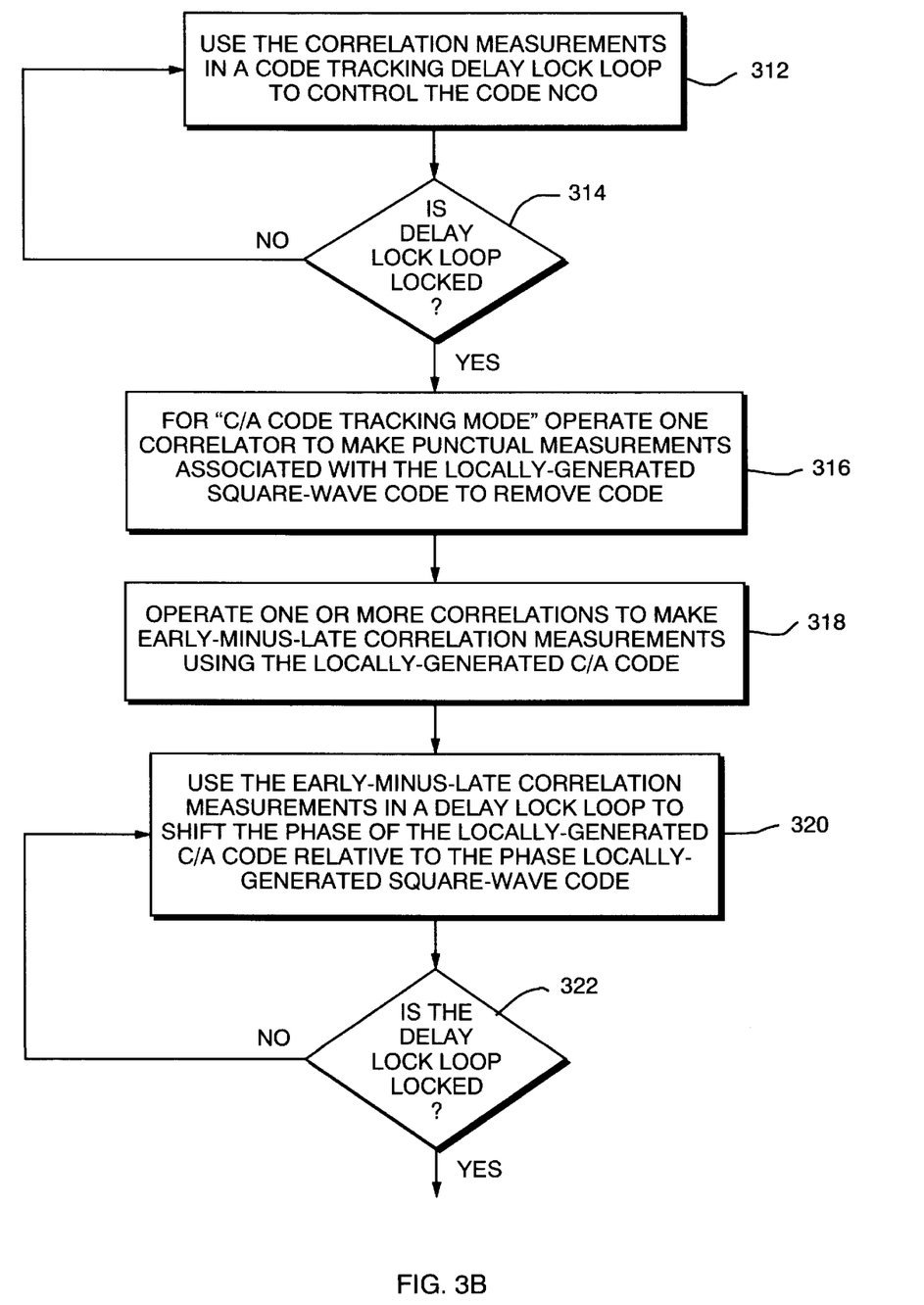
Figure 3C:
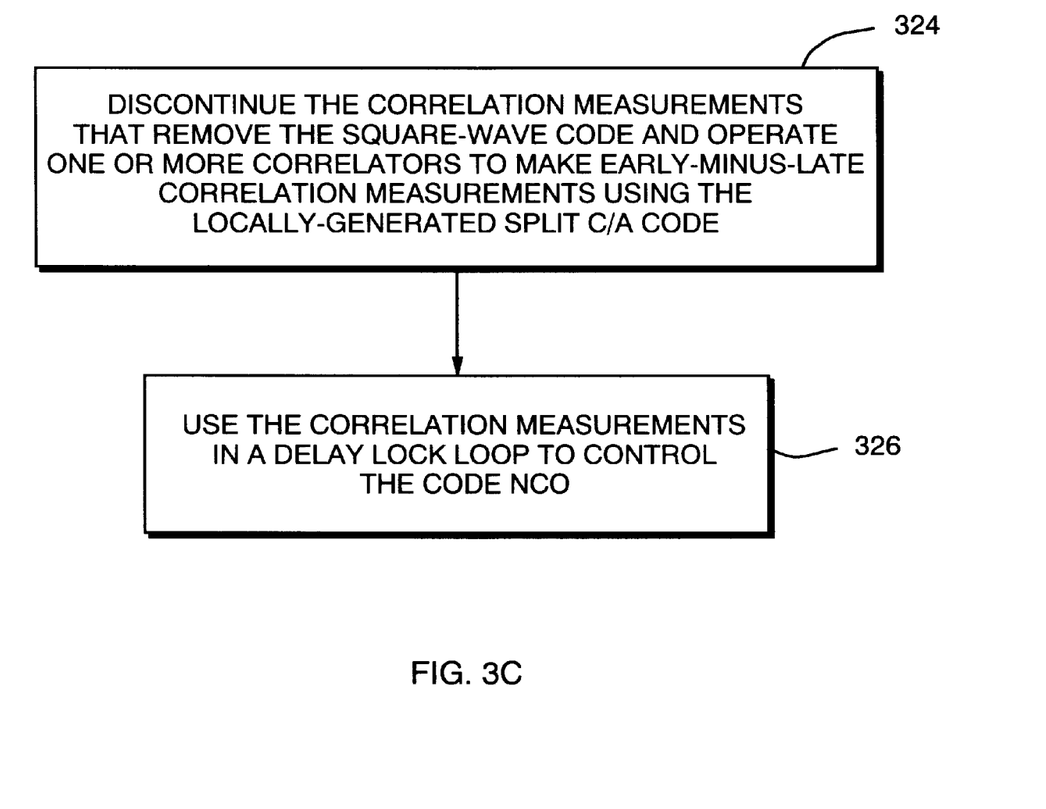

Referring also to FIG. 3, the correlators 23 and 24 are set to operate as "punctual" correlators to acquire the satellite signal (step 300), and correlator 22 is effectively disabled. As discussed in more detail below, each correlator 22 and 24 may also operate as an "early-minus-late" correlator, to make early-minus-late correlation measurements that are used in a code tracking delay lock loop ("DLL"). Alternatively, additional correlators may be used to produce the early-minus-late correlation measurements for code tracking.

Operating in the acquisition mode, the correlators 23 and 24 receive earlier and later versions of the locally-generated split-C/A code that are produced, respectively, by multipliers 46 and 42. Each multiplier 42 and 46 multiplies, or digitally mixes, the locally-generated C/A code produced by the C/A code generator 38 by a square-wave code that is produced by the code NCO 34. The square-wave code is supplied to the multiplier 46 directly from the code NCO 34. A switch 44 that is under the control of the controller 40 supplies the square-wave code to the multiplier 42.

As discussed in more detail below, the correlator 22 is disabled by providing to the correlator a signal of all 1s, such that the I and Q values pass through the correlator unchanged. Alternatively, a disable signal may be supplied to the correlator, to produce essentially the same result.

The correlators 23 and 24 search for correlation power that exceeds a predetermined threshold by taking correlation measurements that are spaced apart in time (step 302). The correlation power is calculated as $I^2+Q^2$ and the minor peaks 2 of the split-C/A code autocorrelation function all become positive, with nulls every 0.5 square wave cycles. To avoid making measurements in the nulls, the correlation measurements are made at times other than multiples of 0.5 square wave cycles. In the system to FIG. 10, the correlation measurements are spaced by slightly less than a C/A code chip.

Once the split-C/A code is detected, that is, once correlation power associated with either correlator 23 or 24 exceeds the predetermined threshold, the receiver uses the correlation measurements in a carrier-tracking phase lock loop, to control the carrier NCO and align a locally-generated carrier with the received carrier (step 304). The system of FIG. 2 performs carrier-aided code tracking, and the carrier tracking information is used in a known manner to control the code NCO 34 (step 306).

Once the carrier-tracking loop is locked (step 308), the receiver operates in a "square-wave code tracking mode." The receiver thus switches the correlator 22 to its tracking mode, in which it makes early-minus-late correlation measurements in accordance with early and late versions of the square-wave code step 310. The correlator 23 continues to receive the split-C/A code and make correlation measurements that are used in the carrier-tracking loop, to maintain alignment between the locally-generated and the received carrier. The correlator 24 continues to operate as a punctual correlator and makes correlation measurements in accordance with a punctual version of the C/A code. The various versions of the codes are produced by the correlator spacing and control circuitry 32, as discussed below with reference to FIG. 5.

The correlator 22, operating in its early-minus-late mode, makes non-zero correlation measurements when the early and late versions of the square-wave code differ. The early-minus-late measurements are used in a DLL and the error signal produced by the DLL is used, in addition to the carrier-tracking information, to control the code NCO 34 (step 312). The code NCO 34 is adjusted in accordance with the DLL error signal to bring the locally-generated square-wave code into alignment with the received square-wave code, and thus, reduce the DLL error signal.

The early-late delay spacing is set by the correlator spacing and control circuitry 32, as discussed in more detail below. If the satellite transmits with sufficient bandwidth and the receiver similarly operates with sufficient bandwidth, the square-wave code autocorrelation function at the receiver has at least somewhat pointed peaks. The delay spacing associated with the early-minus-late correlation measurements may thus be set to a fraction of a square-wave code chip, for more accurate tracking. Otherwise, if the autocorrelation peaks are more rounded, the delay spacing may be set at one square-wave code chip.

Once the DLL is locked (step 314), the two square-wave codes are aligned and the DLL is tracking one of the minor peaks 2. However, the DLL is not necessarily tracking the center minor peak 2c.

To relatively quickly move the correlators to the center minor peak, the receiver operates in a "C/A code tracking mode" in which the phase of the C/A code is adjusted relative to the phase of the square-wave code. In this mode, the receiver switches the correlator 22 back to the punctual mode, and the correlator makes correlation measurements by multiplying the received signal by the punctual version of the square-wave code. This essentially strips the square-wave code from the received split-C/A code and collapses the power spectrum of the received signal to that of the C/A code (step 316).

The receiver also sets the correlator 24 in its tracking mode, to make early-minus-late correlation measurements associated with the locally-generated C/A code (step 318). The code is supplied by the multiplier 42, which multiplies the locally-generated code by a signal of all 1s, with the switch 44 in position B. The delay spacing of the correlator 24 is preferably set to a fraction of a C/A code chip by the correlation spacing and control circuitry 32, as discussed below, with reference to FIG. 5.

The early-minus-late correlation measurements made by the correlator 24 are used in a DLL that controls the operation of the divide-by-ten divider 36. In response to the DLL error signal, the controller 40 steals whole or partial cycles from or adds whole or partial cycles to the fastest clock associated with the divider. This shifts the phase of the C/A code produced by the C/A code generator 38 relative to the phase of the locally-generated square-wave code (step 32), to position the correlator 24 essentially at the peak 3 of the envelope 4 when the DLL is locked. In this operating mode, the code NCO 34 is adjusted in accordance with the carrier tracking information, to maintain the alignment of the locally-generated square-wave code with the received square-wave code as the receiver and/or satellite move relative to one another.

At the satellite, the C/A code and the square-wave code are digitally mixed prior to modulating the carrier. Accordingly, at the satellite the center minor peak 2c of the square-wave code autocorrelation function coincides with the peak 3 of the envelope, that is, with the peak of the C/A code autocorrelation function. At the receiver, the center minor peak 2c and the peak 3 of the envelope 4 may not exactly coincide because of the effects of multipath, and/or the effects of signal manipulation at the receiver. The two peaks should, however, be close enough in time that the accurate tracking of the C/A code autocorrelation peak results in positioning the correlators to track the location of the center minor peak 2c, rather than an adjacent peak.

Once the DLL is tracking the peak 3 of the envelope 4 (step 322), the receiver operates in "split-C/A code tracking mode," in which it directly tracks the center minor peak 2c of the split-C/A code autocorrelation function (step 324). In this mode, the correlator 24 multiplies the received split-C/A code by a locally-generated split-C/A code, which is produced by the multiplier 42. The switch 44 thus moves to a position A, and the multiplier again multiplies, or digitally mixes, the locally-generated C/A code produced by the C/A code generator 38 and the 10.23 MHz square wave produced by the code NCO 34.

In this mode, the correlator spacing and control circuitry 32 provides a signal of all 1s to the correlator 22, to disable the correlator. Alternatively, the receiver may provide an asserted disable signal to the correlator 22.

The correlator 24 makes early-minus-late correlation measurements associated with the locally-generated split-C/A code using a delay spacing that is a fraction of a square-wave code chip. The results are used in a DLL and the associated DLL error signal is used to control the code NCO 34, to fine tune the alignment of the locally-generated split-C/A code with the received code (step 326). In this mode, the correlator 23 continues to make correlation measurements in accordance with the split-C/A code, to maintain alignment of the local and received L2 carriers.

With the DLL locked on the center minor peak 2c, the receiver determines its global position in a known manner and achieves an accuracy that exceeds the accuracy achieved by tracking either the C/A code alone or the encrypted P-code.

Figure 4:
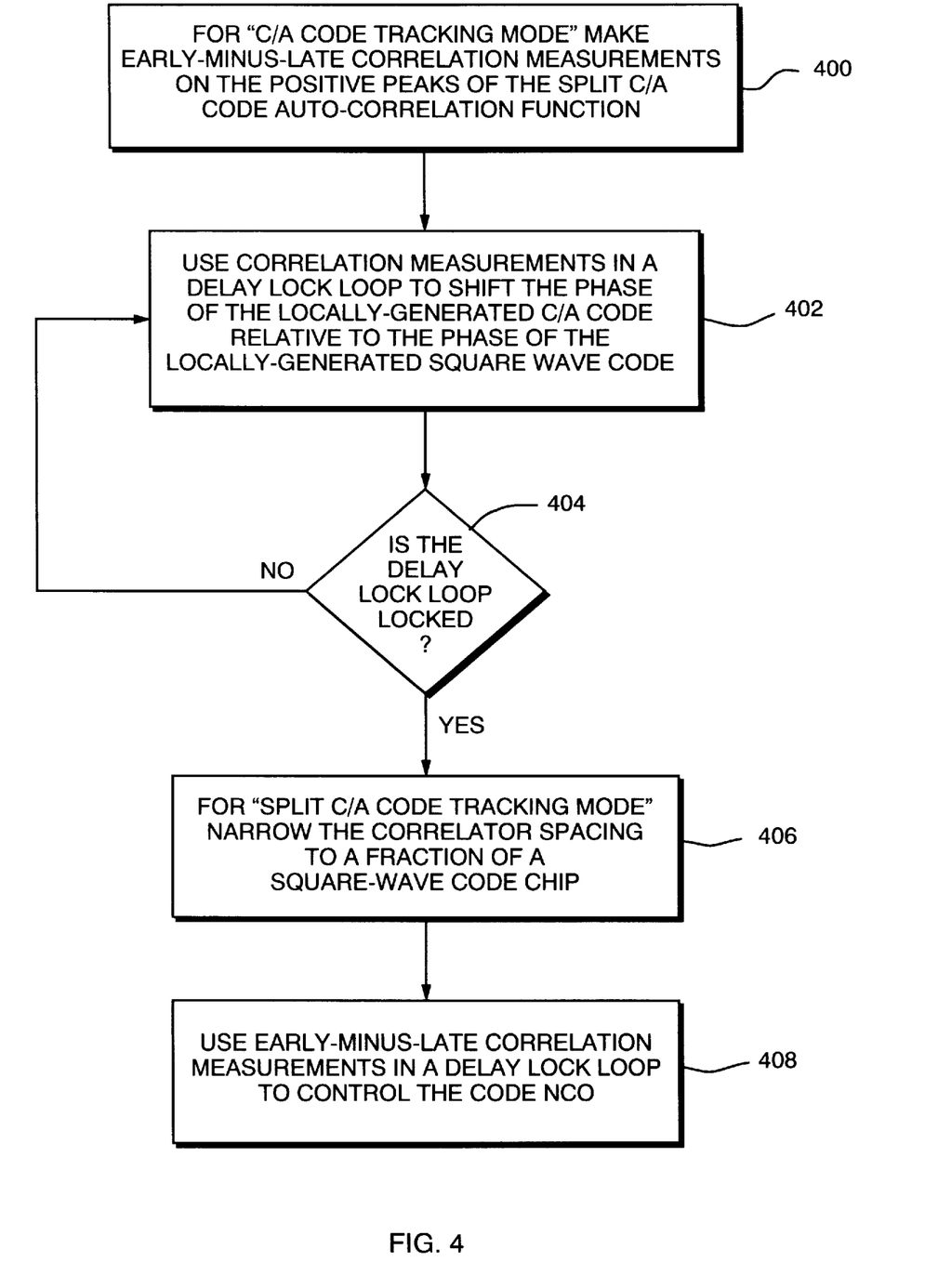
FIG. 4 is a flow chart of alternative operations of the receiver of FIG. 2.

Alternatively, after the receiver is tracking the square-wave code, the receiver may find the center minor peak 2c using the split-C/A code. Referring now to FIGS. 2 and 4, the receiver, which is operating in the C/A code tracking mode, makes early and late correlation measurements on the minor peaks of the split-C/A code autocorrelation function using correlators 23 and 24, and the correlator 22 is disabled (step 400). The correlators 23 and 24 are thus spaced apart by a multiple of 0.5 square-wave cycles.

The correlation peaks in the square-wave code are alternately positive and negative, as depicted in FIG. 1. Accordingly, the controller 40 calculates the error signal for the DLL as early-plus-late based on the early and late correlation measurements produced by the two correlators 23 and 24. The correlation measurements are used in a DLL (step 402), to determine whether to steal cycles from or add cycles to the fastest clock associated with the divide by ten divider 36, in order to shift the phase of the locally-generated C/A code relative to the phase of the locally-generated square-wave code.

The correlation measurements made by the correlator 23 are also used in the carrier tracking loop, to maintain alignment between the received and the locally-generated carriers.

When the DLL error signal is reduced to a minimum (step 404), the receiver narrows the associated early-late delay difference, or correlator spacing, to a fraction of a square-wave code chip, to more accurately track the center minor peak 2c (step 406). Since the correlation measurements are now associated with the same autocorrelation peak of the split-C/A code, the correlator 24 is operated in its earlyminus-late mode. The early-minus-late correlation measurements from the correlator 24 are used in a DLL to control the code NCO, to adjust in synchronism the phases of both the locally-generated square-wave code and the C/A code (step 408).

Figure 5:
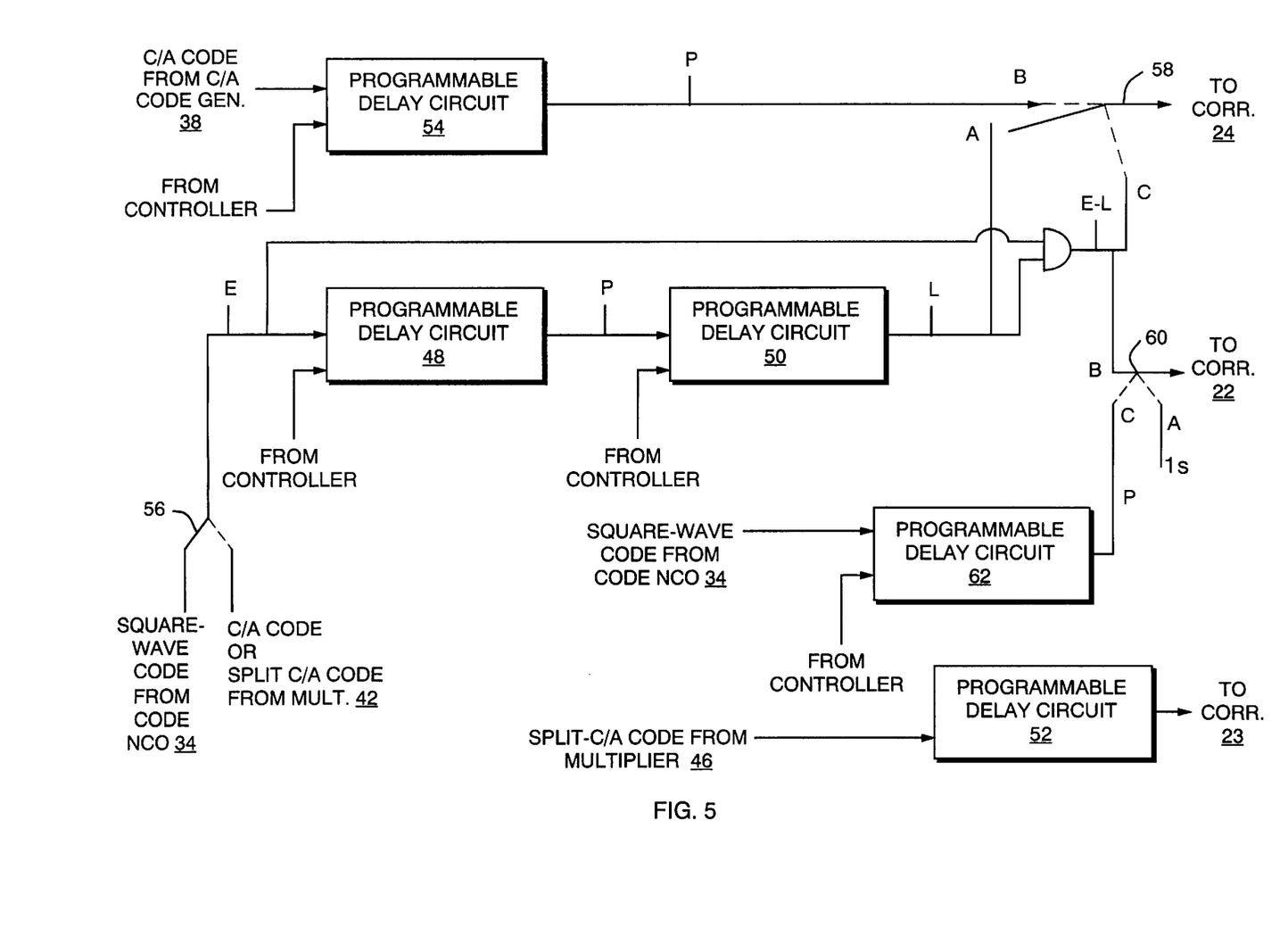
FIG. 5 is a functional block diagram of correlator control and spacing circuitry that is included in the receiver of FIG. 2.

Referring now to FIG. 5, the correlator spacing and control circuitry 32 includes programmable delay circuits 48 and 50 that produce, under the control of the controller 40 the punctual and late versions of the code that is supplied to them through a switch 56. The switch 56, also under the control of the controller, supplies the split C/A code to the delay circuits in both the acquisition mode and the split-C/A code tracking mode. During the square-wave code tracking mode, the switch 56 supplies the square-wave code to the delay circuits, and supplies the C/A code to the delay circuits during the C/A code tracking mode.

A programmable delay circuit 52 produces a punctual version of the split-C/A code for the correlator 23. Another programmable delay circuit 54 produces a punctual version of the C/A code, which is supplied to the correlator 24 through a switch 58 during the square-wave code tracking mode. Alternatively, the delay circuit 52 may be eliminated, with the correlator 23 making correlation measurements associated with an early version of the split C/A code.

The switch 58 is in position A during the acquisition mode, to supply to the correlator 24 the later version of the split-C/A code. The switch then moves to position B during the square-wave tracking mode, to supply to correlator 24 either an early or a punctual version of the C/A code, and to position C during the remaining tracking modes to supply to the correlator early-minus-late signals associated with the C/A code and the split C/A code as appropriate.

A switch 60 is in position A during acquisition to supply to the correlator 22 an all 1s signal, which essentially disables the correlator. The switch 60 moves to position B during the square-wave tracking mode to supply the early-minus-late square-wave code to the correlator. In the C/A-code tracking mode, the switch moves to position C to supply to the correlator a punctual version of the square wave code that is produced by programmable delay circuit 62. When the receiver is operating in the split-C/A tracking mode, the switch 60 is again moved to position A, to supply to the correlator 22 a signal of all 1s.

The controller 40 sets the desired early-late delay spacing, that is, the time between the early and late versions of the codes, by appropriately setting the delays of the programmable delay circuits 48 and 50. The controller can thus vary the early-late delay spacing from, for example, one C/A code chip to a fraction of a square-wave code chip.

If the receiver instead uses the split-C/A code during the C/A code tracking mode, as discussed above with reference to FIG. 4, the switch 56 directs the split-C/A code to the programmable delay circuits 48 and 50 for all modes of operation except the square-wave code tracking mode, during which it directs the square-wave code to the circuits.

The foregoing description has been limited to specific embodiments of this invention. It will be apparent, however, that variations and modifications may be made to the invention, with the attainment of some or all of its advantages. For example, various processors such as the doppler processor and the accumulator and dump processor may be included in components that also contain the correlators. Alternatively, various components of the correlators may be included in separate system components such as signal multipliers and accumulators. It is, therefore, the object of the appended claims to cover all such variations and modifications as come within the true spirit and scope of the invention.

What is claimed is:

1. A GPS receiver for receiving split-C/A coded signals, the receiver including:
   A. a C/A code generator for generating a locally-generated C/A-code;
   B. a square-wave code generator for generating a locally-generated square-wave code;
   C. means for producing a locally-generated split-C/A code, said means digitally mixing the locally-generated C/A code and the locally-generated square-wave code;
   D. correlators for producing correlation measurements for use in:
      (i) synchronizing the locally-generated square-wave code with the square-wave code included in the received signal;
      (ii) synchronizing the locally-generated C/A code with the C/A code included in the received signal; and
      (iii) synchronizing the locally-generated split-C/A code with the split C/A code included in the received signal; and
   E. means for adjusting the phase of the square-wave code produced by the square-wave code generator in response to the correlation measurements associated with the locally-generated square-wave code; and
   F. means for adjusting the phase of the C/A code produced by the C/A code generator relative to the phase of the locally-generated square wave code in response to the correlation measurements associated with the locally-generated C/A code.

2. The receiver of claim 1 wherein:
   the square-wave code generator is a code NCO; and
   the means for adjusting the phase of the locally-generated square-wave code also adjusts the phase of the split-C/A code in accordance with correlation measurements associated with the locally-generated split-C/A code.

3. The receiver of claim 2 wherein the means for shifting the phase of the C/A code is a divide-by-ten divider that divides down the square-wave code signal produced by the code NCO to produce the clock signal for the C/A code generator.

4. The receiver of claim 3 wherein the means for shifting the phase of the C/A code includes a means for stealing whole or partial cycles from or adding whole or partial cycles to a clock that controls the divide-by-ten divider.

5. The receiver of claim 1 further including carrier synchronizing means for aligning a locally-generated carrier with a carrier in the received signal.

6. The receiver of claim 5 wherein the carrier synchronizing means provides carrier information to the means for aligning the square-wave code to compensate for relative movement of the receiver and a satellite that transmits the split-C/A code.

7. A method of synchronizing a locally-generated split-C/A code to a split-C/A code in a received signal, the method including the steps of:
   A. producing a locally-generated square-wave code and using early-minus-late correlation measurements associated with the locally-generated square-wave code to align the locally-generated square-wave code with the square-wave code in the received signal;
   B. removing the square-wave code from the received signal by multiplying the received signal by a punctual version of the locally-generated square-wave code;
   C. producing a locally-generated C/A code and usinig early-minus-late correlation measurements associated with the locally-generated C/A code to align the locally-generated C/A code with the C/A code in the received signal by shifting the phase of the locally-generated C/A code relative to the phase of the locally-generated square-wave code; and D. tracking the split-C/A code using early-minus-late correlation measurements associated with a locally-generated split-C/A code.

8. The method of claim 7 further including the step of producing the locally-generated split-C/A code by digitally mixing the locally-generated square-wave code and the locally-generated C/A code.

9. The method of claim 7 further including the step of aligning a locally-generated carrier with a carrier in the received signal.

10. The method of claim 9 further including the step of using carrier alignment information to adjust the phase of the locally-generated square-wave code.

11. A method of synchronizing a locally-generated split-C/A code to a split-C/A code in a received signal, the method including the steps of:

A. producing a locally-generated square-wave code and using early-minus-late correlation measurements associated with the locally-generated square-wave code to align the locally-generated square-wave code with the square-wave code in the received signal;

B. shifting the phase of a locally-generated C/A code that is included in the locally-generated split-C/A code in accordance with early-minus-late correlation measurements associated with the locally-generated split-C/A code that are made at the locations of peaks in an autocorrelation function associated with the split-C/A code; and C. tracking the split-C/A code using early-minus-late correlation measurements associated with a locally-generated split-C/A code.

12. The method of claim 11 further including the step of producing the locally-generated split-C/A code by digitally mixing the locally-generated square-wave code and the locally-generated C/A code.

13. The method of claim 11 further including the step of aligning a locally-generated carrier with a carrier in the received signal.

14. The method of claim 13 further including the step of using carrier alignment information to adjust the phase of the locally-generated square-wave code.

15. A GPS receiver for receiving split-C/A coded signals, the receiver including:

A. a C/A code generator for generating a locally-generated C/A-code;

B. a square-wave code generator for generating a locally-generated square-wave code;

C. a multiplier for producing a locally-generated split-C/A code, the multiplier digitally mixing the locally-generated C/A code and the locally-generated square-wave code;

D. correlators for producing correlation measurements for use in:
  (i) synchronizing the locally-generated square-wave code with the square-wave code included in the received signal;
  (ii) synchronizing the locally-generated C/A code with the C/A code included in the received signal; and
  (iii) synchronizing the locally-generated split-C/A code with the split C/A code included in the received signal; and E. a controller for
  i. adjusting the phase of the square-wave code produced by the square-wave code generator in response to the correlation measurements associated with the locally-generated square-wave code; and
  ii. adjusting the phase of the C/A code produced by the C/A code generator relative to the phase of the locally-generated square wave code in response to the correlation, measurements associated with the locally-generated C/A code.

16. The receiver of claim 15 wherein:
a. the square-wave code generator is a code NCO; and
b. the controller further adjusts the phase of the locally-generated split-C/A code in accordance with correlation measurements associated with the split-C/A code.

17. The receiver of claim 16 further including
c. a divide-by-ten divider that divides down the square-wave code signal produced by the code NCO to produce the clock signal for the C/A code generator, and
d. the controller controls the divide-by-ten counter to adjust the phase of the locally-generated C/A code relative to the locally-generated square wave code.

18. The receiver of claim 17 wherein the controller controls the divide-by-ten counter by stealing whole or partial cycles from or adding whole or partial cycles to a clock that is included in the divide-by-ten divider.

19. The receiver of claim 15 further including carrier synchronizing means for aligning a locally-generated carrier with a carrier in the received signal.

20. The receiver of claim 19 wherein the carrier synchronizing means provides carrier information to the controller, and the controller uses the carrier information to control the code generators and compensate for relative movement of the receiver and a satellite that transmits the split-C/A code.

* * * * *